United States Patent
Wybrow et al.

[15] 3,650,205
[45] Mar. 21, 1972

[54] SERIAL NUMBER PRINTING MACHINES

[72] Inventors: Patrick S. Wybrow, Truro; Philip Muzlish, North Harrow, both of England

[73] Assignee: said Wybrow, by said Muzlish

[22] Filed: Feb. 25, 1970

[21] Appl. No.: 13,936

[52] U.S. Cl. .......................................... 101/72, 235/61.7 A
[51] Int. Cl. ............................. B41j 3/00, G06k 19/00
[58] Field of Search............ 101/93 C, 72, 90; 235/61.7, 235/61.7 A, 153, 1, 92, 61.6

[56] References Cited

UNITED STATES PATENTS

| | | | |
|---|---|---|---|
| 2,805,824 | 9/1957 | Knutsen | 235/61.7 A |
| 2,755,022 | 7/1956 | Knutsen | 235/61.6 |
| 2,731,196 | 1/1956 | Luhn | 235/61.7 A |
| 2,886,239 | 5/1959 | Reumerman et al. | 235/61.7 A |
| 2,661,896 | 12/1953 | Luhn | 235/1 |
| 2,731,201 | 1/1956 | Harper | 235/92 |
| 2,754,054 | 7/1956 | Helmig et al. | 235/61.6 |
| 3,448,254 | 6/1969 | Verhoeff | 235/153 |

Primary Examiner—William B. Penn
Attorney—Watson, Cole, Grindle & Watson

[57] ABSTRACT

Machine having means for printing serial numbers and means for printing check digits. The check digit printer is controlled by means including counting means having one counting unit for each digit of the serial number to be printed, the advancement of a counting unit transmitting pulses to operate the check digit printer. The means for controlling the check digit printer may be electromechanical or electronic. The counting units may be cold-cathode gas filled decade counters.

11 Claims, 2 Drawing Figures

FIG. I.

SERIAL NUMBER PRINTING MACHINES

This invention relates to machines for printing serial numbers. Printed serial numbers are required on many different types of stationary such as vouchers, warrants, certificates, checks, payable orders and receipts. It is sometimes required to print in association with the serial number a so called random check digit which is employed to enable the quotation of a serial number to be checked for accuracy. Check digits are particularly valuable where the numbers are to be read by automatic means such as where the numbers are in magnetic ink and are read by a reader forming an input to a computer.

The check digit which is printed with the serial number is derived from the serial number by carrying out a number of predetermined arithmetic operations on the digits of the serial number. Thus when a serial number and random check digit are quoted later it is possible to perform the arithmetic operation on the digits of the serial number and compare the result with the random check digit; if there is a difference either the serial number or the random check digit has been wrongly quoted. Of course, the checking will normally be performed by the computer. The random check digit may be derived by multiplying each digit of the serial number by a predetermined multiplier, summing the results and subtracting the units digit of the sum from a predetermined number. It is found that by following this procedure with a series of numbers, the random check digit follows a repeated sequence of the ten digits, from zero to nine, (assuming that the said predetermined number is 10), although not necessarily in numerical order, but whenever there is a carry in the serial number e.g., when the serial number changes from nine to 10, from 19 to 20, from 99 to 100, from 109 to 110, and so on) the random check digit sequence has a jump introduced into it. The jump may be of one amount when the carry is from the units to the tens, another amount from the tens to the hundreds, another from the hundreds to thousands and so on, and in certain cases the jump may be zero, i.e., there in no advance in the random check digit sequence, or one, i.e., the random check digit advances in unaltered sequence.

According to the present invention, a serial number printing machine includes means for printing serial numbers and means for printing random check digits, the means for printing random check digits comprising counting means having one counting unit for each digit of the serial number to be printed, which counting units are advanced in synchronism with the corresponding digit printing devices of the printing mechanism, means associated with each counting unit arranged for the transmission, on advancement of the counting unit, of a predetermined number of pulses to operate means for positioning the random check digit printer means in accordance with the number of pulses transmitted to it, and selection means for activating the transmission means associated with the highest of the counting units advanced during a serial number printing cycle.

The means for controlling the random check digit printer may be of an electromechanical nature. Thus, in possible construction, the counting units are cam wheels which are rotated in substantially the same manner as the discs of a normal counting box, the transmission means are cam wheels mounted on a common shaft and controlling switching means for generating the pulses, and the selection means are switches controlled by the first cam wheels.

Preferably, however, electronic means are employed for controlling the random check digit printer. Thus the counting means may comprise electronic counting units such as cold cathode gas filled decade counters. These may control displays such as neon number tubes so that the serial number being printed at any one time is visually indicated.

The control means may include a pulse generator and each transmission means may be arranged to open a path for the passage of pulses from the pulse generator to the positioning means on advancement of the associated counting unit until a predetermined number of pulses has passed and then to close the path. The control means may include a pulse counter and each transmission means may include a bistable arranged to close the path after the pulse counter has counted the said predetermined number of pulses.

In a preferred arrangement, the selection means includes means for deactivating a signal arising from each of the counting units being advanced other than the highest counting unit being advanced. The deactivation means may comprise, for each counting unit other than the highest, an AND gate having an input connected to the output of each of the AND gates associated with the higher counting units. There is preferably a delay element between each of the counting units except the highest and its associated AND gate, the length of delay of the elements decreasing progressively from the lowest towards the highest counting unit.

The invention may be carried into practice in various ways and the random check digit printer control system of one serial number and random check digit printer will now be described by way of example with reference to the accompanying diagrams, in which.

Figure 1:
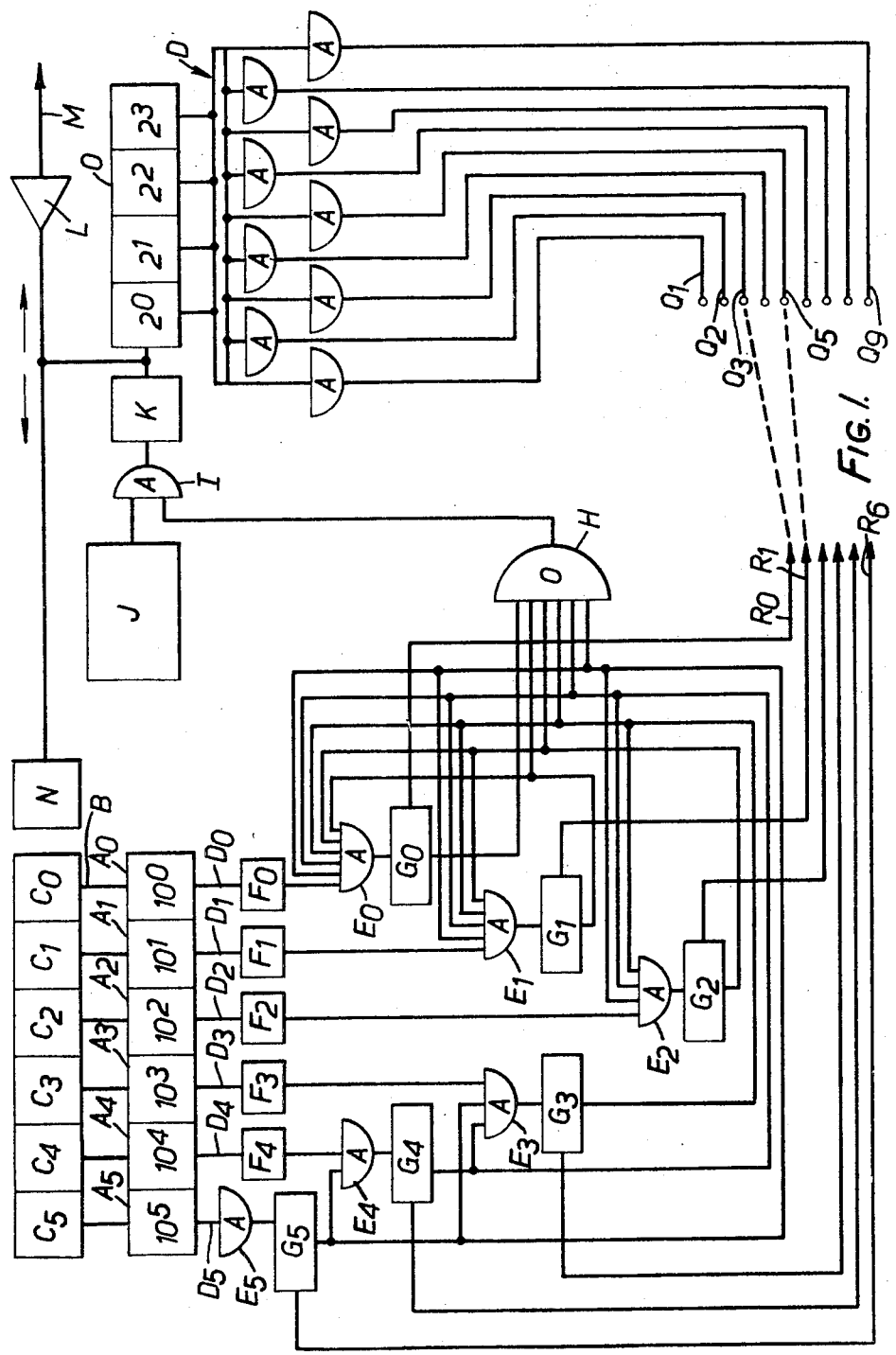
FIG. 1 shows the system.

The printer includes a standard numbering box (not shown) for printing the serial number which, for convenience, will be assumed to consist of six digits. Each digit is printed by means of a numbering wheel in the box and the control system includes an electronic counter consisting of six counting units $A_0$ to $A5$ which operate in synchronizm with the numbering wheels by means of a pulse fed over a signal input line B to the counting unit $A_0$ each time the numbering box is advanced one unit. Each unit $A_0$–$A_5$ is a decade counter arranged to deliver a pulse to the unit of the next highest order when it completes its own count of 10. It will be seen that the boxes representing the counting units have been labeled with the powers of ten corresponding to the values of the digits of the respective numbering wheels. Clearly there may also be supplementary means for maintaining the individual counting units in synchronizm with the individual printing wheels so that they may both be preset to any required number. Each of the counting units is coupled to a corresponding display such as a neon number tube $C_0$ – $C_5$ so that the number being printed at any given time can be read from the display. Each time any of the counters $A_0$ to $A_5$ changes from one position to the next position in synchronism with a corresponding change in the numbering wheels in the numbering box, a pulse is delivered through a corresponding line $D_0$ – $D_5$ to an AND gate $E_0$ – $E_5$. Each of the lines $D_0$ – $D_4$ includes a delay element $F_0$ – $F_4$. The amount of delay introduced decreases progressively from $F_0$ to $F_4$. The output from each AND gate goes to a bistable $G_0$ – $G_5$ and the outputs from all the bistables are connected as inputs to an OR gate H. The output from the bistable $G_5$ is also connected as an input to each of the AND gates $E_0$ – $E_4$. The output from the bistable $G_4$ is also connected as an input to each of the AND gates $E_3$ – $E_0$ and similarly the outputs of the bistables $E_3$ to $E_1$ are connected as inputs to the lower AND gates. The output from the OR gate H forms one input to an AND gate I the other input to which comes from a pulse generator J. The output from the AND gate I passes through a pulse shaper K and an amplifier L to an output line M leading to the random check digit printer. The random check digit printer includes a single numbered printing wheel and a solenoid-operated pawl and ratchet mechanism arranged to advance the printing wheel by one position for each pulse supplied to it along the line M. The line M also leads to a random check digit display N alongside the displays the displays $C_0$ – $C_5$ so that the random check digit being printed is displayed alongside the serial number being printed.

The components $D_0$, $F_0$, $E_0$, $G_0$, H, I, J, K, L, and M, constitute a transmission means associated with the counter $A_0$ for controlling the supply of pulses to the mechanism 14 when the unit $A_0$ is advanced.

The output from the pulse shaper K also passes to a four digit binary counter 0 which, by a system D which is shown in FIG. 1 partly in block form and which comprises a number of AND gates which will be described in detail below, transmits reset pulses to socket outlets $Q_1$ to $Q_9$ in a patch board. After the counter 0 has counted one pulse a reset pulse is transmitted to outlet $Q_1$, after two pulses to outlet $Q_2$ and so on. The resetting input of each of the bistables $G_0 - G_5$ is connected to one of the outlets $Q_1$ to $Q_9$. For example, the reset terminal $R_0$ and $R_1$ of the bistables $G_0$ and $G_1$ might be connected to the outputs $Q_3$ and $Q_5$ as indicated by dotted lines in FIG. 1.

Operation of the system is as follows. When a pulse is fed into the counter through the line B and the counter unit $A_0$ is the only unit to change, a pulse will be delivered along the line $D_0$ through the delay $F_0$ to the AND gate $E_0$. The AND gate $E_0$ is arranged to conduct when a pulse is received through the line $D_0$ and when the signals received from the bistables $G_1 - G_5$ are of the kind indicating that those bistables are in their normal states. Accordingly, the AND gate $E_0$ conducts and the bistable $G_0$ is triggered to its other state. The OR gate H is arranged to conduct when one of its inputs is an output from a bistable in its other state. Accordingly, the OR gate H conducts and a signal is passed to the AND gate I which opens to pass pulses from the pulse generator to the output line M. The pulses passed are also counted by the binary counter 0 which, when it has counted three pulses, passes a signal to the output terminal $Q_3$ which passes along the reset line $R_0$ to reset the bistable $G_0$. This closes the gates H and I. Three pulses will have been passed along the output line to the random check digit printer which will have been advanced by three units.

If the input pulse along the line B causes the counting unit $A_0$ to move from 9 to 10, the counting unit $A_1$ also will be advanced by one unit and substantially simultaneous pulses will pass along the lines $D_0$ and $D_1$. The time delay introduced by the delay $F_1$ is shorter than that introduced by the delay $F_0$ so the signal from unit $A_1$ reaches the AND gate $E_1$ before the signal from $A_0$ reaches the AND gate $E_c$. Accordingly, the bistable $G_1$ is triggered to its other state and the output from this bistable will form an input to the AND gate $E_0$ preventing the AND gate $E_0$ opening. The output will also open the gates H and I which will remain open until the binary counter 0 has counted five pulses and a reset signal has been passed through $Q_5$ and $R_1$ to reset the bistable $G_1$, i.e., to act with the bistable associated with the highest of the counting units. At the same time five pulses will have been passed through the outlet line M to advance the random check digit by five positions.

In a similar way, when any of the higher counting units $A_2$ to $A_5$ is advanced by one unit the AND gates of the lower counting units will be rendered nonconductive by the output from the bistable of the highest counting unit advanced since the signal to this bistable is delayed by a shorter time than the signals to the lower bistables.

Figure 2:
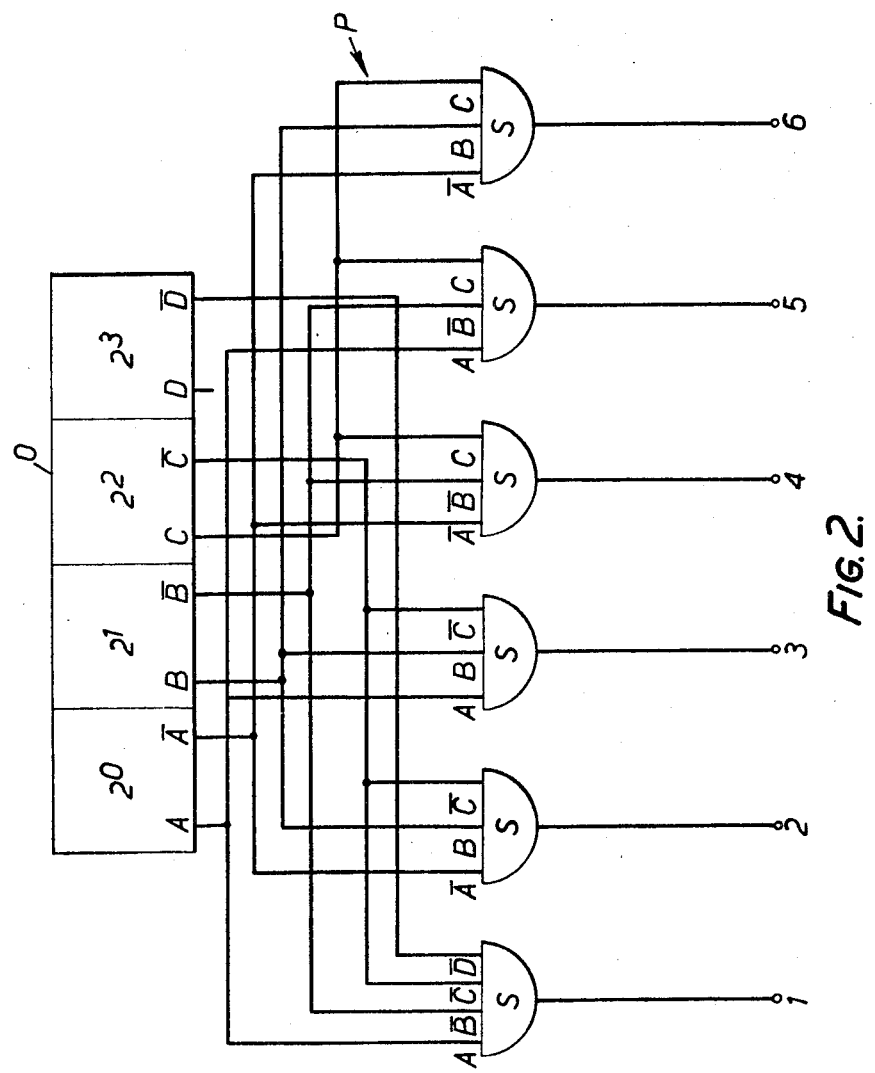
FIG. 2 is a detail of a signal generation system forming part of the system shown in FIG. 1.

The system D for transmitting reset pulses to the bistables which is briefly referred to above is shown in more detail in FIG. 2 which shows the components necessary for outputs after each pulse received by the binary counter up to six. The components necessary for outputs after counts of seven, eight and nine as indicated in FIG. 1 will easily be understood when reference has been made to FIG. 2. The system comprises six AND gates S and their connections to the appropriate output terminals of the binary counter 0.

In order to be able to select any number up to nine for any of the six bistables, six separate systems P would be necessary to accommodate the case in which each bistable is to be reset after the same number of pulses, To avoid this it is possible to provide a supply of plug-in gating systems for counting various numbers of pulses and to select for each bistable an appropriate system which is plugged into the binary counter and to which the reset input of the bistable is connected.

While the invention has been described in connection with the preferred embodiment, it will be understood that it is not limited to that described. Accordingly, the invention is intended to cover all alternatives, modifications and equivalents as may be included within the scope and spirit of the invention as defined by the following claims.

What we claim as our invention and desire to secure by Letters Patent is:

1. In a printing machine having means for printing a sequence of serial number digits and means for printing a check digit associated with each serial number, control means comprising:

means for computing said check digits for each said serial number as it is printed, said means including multi-unit counting means having one counting unit for each digit of said printed serial number, means for advancing said counting units in synchronization with the operation of said serial number digit printing means, means for advancing the individual check digits in accordance with the state of said multi-unit counting means;

means for transmitting from each counting unit a predetermined number of pulses to said means for advancing said check digits, and means for selecting an individual transmission means associated with the most advanced of said counting units in a serial number printing cycle.

2. The printing machine as set forth in claim 1 wherein said counting units are electronic counting units.

3. The printing machine as set forth in claim 2 wherein said counting units are cold-cathode gas-filled decade counters.

4. The printing machine as set forth in claim 2 further comprising a visual display controlled by each of said counting units for indicating the number held by each said counting unit.

5. The printing machine as set forth in claim 1 further comprising a pulse generator and wherein each transmission means provides a path for the passage of pulses from said pulse generator to said means for advancing the individual check digits with the advancement of the associated counting unit until a predetermined number of pulses has passed and said transmission means opening said path.

6. The printing machine as set forth in claim 5 further comprising a pulse counter and wherein each transmission means includes a bistable circuit for interrupting said path after the pulse counter has counted the said predetermined number of pulses.

7. The printing machine as set forth in claim 6 further comprising a plurality of AND gates and wherein said pulse generator and each of said bistable circuits is connected to an AND gate having an output connected to said means for advancing the individual check digits.

8. The printing machine as set forth in claim 7 further comprising an OR gate and wherein said bistable circuits are connected to said AND gate through said OR gate.

9. The printing machine as set forth in claim 1 wherein said selection means includes means for deactivating a signal from each of said counting units other than said most advanced counting unit.

10. The printing machine as set forth in claim 9 wherein said deactivation means comprises, for each counting unit other than the highest order counting unit, an additional AND gate having an input connected to the output of each of said AND gates associated with the higher counting units.

11. The printing machine as set forth in claim 10 further comprising a delay element between each of said counting units and its associated AND gate with the exception of the highest order counting unit, the length of delay of said elements decreasing progressively from the lowest towards the highest counting unit.

* * * * *